UNITED STATES PATENT OFFICE.

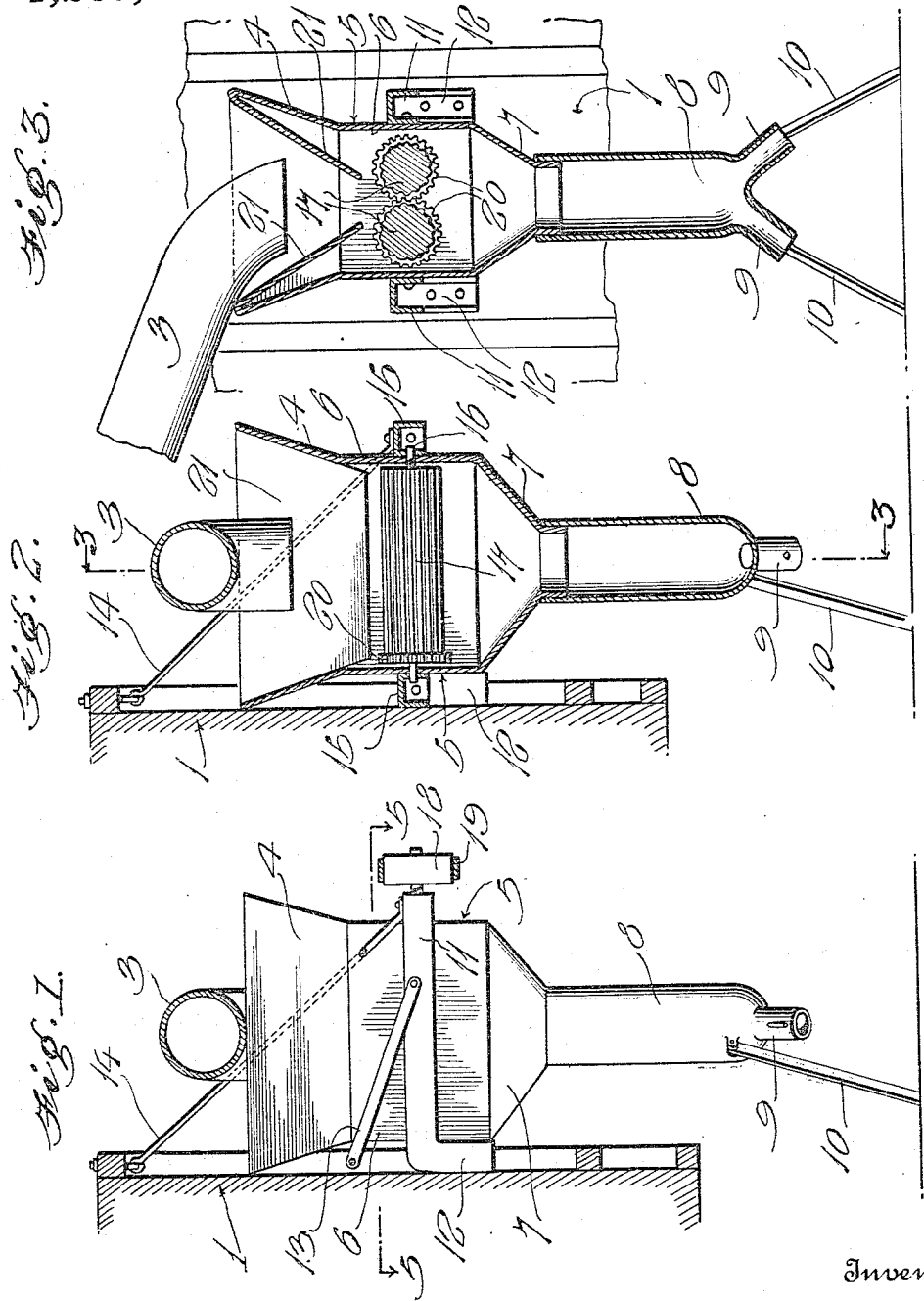

JAMES C. GREEN, OF PRAIRIE CITY, OREGON.

CRUSHING ATTACHMENT FOR THRESHING-MACHINES.

1,267,658.   Specification of Letters Patent.   Patented May 28, 1918.

Application filed February 12, 1917. Serial No. 148,101.

*To all whom it may concern:*

Be it known that I, JAMES C. GREEN, a citizen of the United States, residing at Prairie City, in the county of Grant and State of Oregon, have invented certain new and useful Improvements in Crushing Attachments for Threshing-Machines; and I do declare the following to be a full, clear, and exact description of the invention, such as will enable others skilled in the art to which it appertains to make and use the same.

My invention relates principally to attachments for threshing machines which roll or crush the grain as discharged from the grain conveyer, and the object is to provide an improved detachable outlet pipe for the crushed grain. With this general object in view, the invention resides in the novel features of construction and unique combinations of parts to be hereinafter fully described and claimed, the descriptive matter being supplemented by the accompanying drawings which constitute a part of this application and in which:

Figure 1 is a side elevation of a crusher embodying the invention;

Fig. 2 is a vertical section thereof; and

Fig. 3 is a vertical section on the plane of the line 3—3 of Fig. 2.

In the drawings above briefly described, the numeral 1 designates broadly a threshing machine while 2 has reference to the conveyer through which the threshed grain is discharged, said conveyer extending transversely across the top of the thresher in the well known manner and having at its delivery end an inclined downwardly extending discharge pipe 3. The pipe 3 delivers into the upper end of a hopper 4 carried by the upper edge of a casing 5 including vertical side plates 6 and a funnel-shaped bottom 7 from which a detachable delivery pipe 8 depends, said pipe preferably having a pair of branches 9 on its lower end for filling a pair of sacks simultaneously with the grain which is crushed in the casing 5 by the means to be described. Inclined legs 10 are connected at their upper ends to the pipe 8 and rest at their lower ends on the ground to support and brace said pipe.

The side plates 6 of the casing 5 are shown in the present embodiment of the invention as secured in contact with the inner faces of a pair of parallel horizontal channel-iron bars 11 whose inner ends are bent downwardly at 12 and secured to the side of the thresher 1, this being a simple and inexpensive yet effective means of supporting said casing and the crushing means therein. Inclined brace bars 13 extend inwardly from the bars 11 and are secured to the thresher while brace rods 14 extend from the latter to the outer ends of said bars. The outer and inner ends of the bars 11 are connected by horizontal bars 15 rigidly secured thereto and each having a pair of suitable bearings in which the shafts 16 of a pair of parallel crushing rolls 17 are mounted, said rolls being corrugated as shown clearly in Fig. 4. One of the shafts 16 is provided with a pulley 18 around which a belt 19 passes, said belt being driven from any suitable part of the thresher 1.

As shown in Fig. 4, the pipe 3 will deliver the grain between the two rolls 17 which are driven one from the other by the spur gears 20, the hopper 4 preferably having a pair of downwardly converging plates 21 extending inwardly from the upper edges of its sides to effectively guide the grain between said rolls. It will thus be obvious that as the threshed grain is discharged from the conveyer 2, it will travel through the pipe 3 into the hopper 4 and will be directed by the latter between the rolls 17 which crush the same, the crushed grain being discharged through the pipe 8 and its branches 9 into sacks or other suitable containers.

The invention is extremely simple and inexpensive, may be readily attached to numerous types of threshing machines, and will be highly efficient and durable wherever used. For these reasons, the construction shown constitutes the preferred form of the crusher, but it is to be understood that within the scope of the invention as claimed, numerous changes may be made without sacrificing the principal advantages.

I claim:

1. The combination with an elevated casing, of a vertical discharge pipe for said casing having its lower end spaced above the ground for delivery into a receptacle, said pipe being detachable from said casing by downward movement, and a pair of inclined legs movably connected with said pipe and resting on the ground to prevent downward movement of said pipe and to brace the same.

2. In a receptacle filling means, the combination of an elevated casing having a depending outlet collar, a vertical outlet pipe whose upper end slidably surrounds said collar and is removable therefrom by downward movement, the lower end of said outlet pipe having a plurality of downwardly diverging outlet branches, and a plurality of inclined downwardly diverging legs pivoted at their upper ends to said pipe, the lower ends of said legs resting on a solid surface to support said outlet pipe in operative position and to brace the same, said legs being disposed adjacent said branches, whereby the receptacles to be filled may rest against said legs and be thus prevented from tilting.

In testimony whereof I have hereunto set my hand in the presence of two subscribing witnesses.

JAMES C. GREEN.

Witnesses:
F. W. PEET,
A. M. F. KIRCHHEINER.

Copies of this patent may be obtained for five cents each, by addressing the "Commissioner of Patents, Washington, D. C."